Jan. 5, 1926. 1,568,662
J. G. FRIEMAN ET AL
COMBINATION SIGNAL DEVICE FOR VEHICLES
Filed Jan. 15, 1923 5 Sheets-Sheet 1

Jan. 5, 1926. 1,568,662
J. G. FRIEMAN ET AL
COMBINATION SIGNAL DEVICE FOR VEHICLES
Filed Jan. 15, 1923 5 Sheets-Sheet 5

Patented Jan. 5, 1926.

1,568,662

UNITED STATES PATENT OFFICE.

JACOB G. FRIEMAN, OF ST. PAUL, MINNESOTA, AND WILLIAM A. RANKIN, OF OAK PARK, ILLINOIS; SAID RANKIN ASSIGNOR TO SAID FRIEMAN.

COMBINATION SIGNAL DEVICE FOR VEHICLES.

Application filed January 15, 1923. Serial No. 612,861.

*To all whom it may concern:*

Be it known that we, JACOB G. FRIEMAN and WILLIAM A. RANKIN, citizens of the United States, residing at St. Paul and Oak Park, respectively, in the counties of Ramsey and Cook and States of Minnesota and Illinois, have invented certain new and useful Improvements in Combination Signal Devices for Vehicles, of which the following is a specification.

The present invention relates to a signal device which is adapted to be mounted upon an automobile or like vehicle, for the purpose of enabling the driver of the vehicle to announce or indicate any contemplated change in the movement of the vehicle and thereby enable pedestrians and drivers of other vehicles to govern their actions in such a manner as to avoid accidents.

This signal is in many respects an improvement upon the vehicle signal disclosed in Patent No. 1,399,339, which was granted to J. G. Frieman on December 6, 1921, and embodies quite a number of additional features which enlarge the range of usefulness of the signal and enhance the practical and commercial value thereof.

In all of the larger cities, and indeed in most of the smaller cities, the congestion of traffic has become so great that the use of some signal of this character upon automobiles is getting to be recognized as a necessity and as essential to safe driving. Among the objects of the present invention is to provide a signal for vehicles which has a compact construction so that it can be readily mounted in position, which is operated in the proper manner with a minimum amount of attention from the driver, and which may be constructed to signal the direction of a contemplated turn, in addition to displaying the usual "Slow" and "Stop" signs.

With the above and other objects in view the invention consists in certain combinations, arrangements and associations of the parts, as will more fully appear as the description proceeds, the novel features thereof being pointed out in the appended claims.

For a full understanding of the invention, reference will now be had to the accompanying drawings forming a part of this specification, wherein:

Figure 12 is a detail view of the rack and pinion device for opening and closing the shutter for the direction indicating arrow.

Like parts are referred to throughout the following description and accompanying drawings by the same reference characters.

Referring to the drawings, which illustrate one possible embodiment of the invention, the numeral 1 designates a front of the casing, and 2 the body portion thereof, the said members 1 and 2 having a complemental formation and providing a closed housing within which most of the mechanism is mounted. The casing front 1 is provided at opposite sides with the "Slow" sign 3 and the "Stop" sign 4, respectively, said signs being preferably arranged vertically and disposed toward the top of the casing so that a direction indicating sign can be arranged at the bottom of the casing under the "Slow" and "Stop" signs. The "Slow" and "Stop" signs are in the form of transparencies which are applied to suitable window openings in the casing front 1, and the direction indicating sign 5 is adapted to be displayed through a window 6 at the bottom of the front 1. Arranged at the intermediate portion of the front 1, between the "Slow" sign 3 and the "Stop" sign 4, are the two windows or openings which are provided respectively with a ruby glass 7 and an opal glass 8. The various pieces of glass which fits over the windows of the casing are clamped between the casing front and a glass retaining plate or frame 9 which is arranged within the casing front 1 and secured to the peripheral flanges thereof. The laterally bent edge portions of the glass retaining frame 9 are adapted to telescope within the open end of the casing body 2 and may be suitably reinforced, as indicated at 10. The casing front 1 is thus properly positioned upon the body of the casing and the two members may be securely fastened together by screws 11 or like fastening devices, as indicated more clearly by Figure 5 of the drawings. The glass retaining frame 9 is shown as having small ears 12 stamped therefrom and bent laterally, said ears being properly arranged to engage the edge portions of the different pieces of glass and hold the same against lateral displacement.

The "Slow" and "Stop" signs are normally covered by the shutters 13, which are pivotally mounted upon the casing and adapted to swing laterally in opposite directions. The shutters are shown as formed of sheet metal and as having annular reinforcing ribs 13ª stamped therefrom. The upper and inner corners of the shutters are provided with hub members 14, and the outer edges of the respective shutters are provided with rearwardly extending flanges which engage the sides of the casing when the shutters are closed. The hub of each shutter is rigidly attached to the outer end of a shutter operating shaft which extends transversely through the casing and is suitably journaled therein.

The shutter 16 for the direction indicating sign is horizontally disposed and is adapted to swing outwardly and upwardly about a horizontal axis disposed at the upper edge thereof. The hinge pintles 17 at the upper end of the shutter 16 engage appropriate hinge members 18 which are applied to the casing front 1, and one of the pintles 17 is formed with a pinion 19 which is engaged by a rack 20 at the forward end of a shutter operating plunger 21.

The direction indicating sign 5 is in the form of a transparency which is provided with a double headed arrow, means being provided, as will be hereinafter more fully set forth, for covering and concealing either end of the arrow, so that the arrow can be used to indicate that the driver of the vehicle contemplates making a turn either to the right or to the left. This transparent sign 5 is slidably mounted for horizontal movement within a guide frame 22 which is arranged back of the bottom window 6 of the casing. The guide frame 22 has a suitable opening in the front thereof for the display of the arrow sign, and the upper and lower edges of the frame are returned or bent to provide channel members 22ª which slidably receive the same. An arm 23 is permanently attached to this slidable arrow sign and projects rearwardly therefrom, providing a means for sliding the same either to the right or to the left so that either one of the heads of the double headed arrow sign may be concealed and the same utilized to indicate a contemplated turn of the vehicle in either direction. In the particular embodiment of the signal which I have illustrated, the double headed arrow sign 5 is normally positioned with the arrow head at the right hand end thereof moved behind and concealed by the casing so that the sign is in a proper position to indicate a turn to the left. Accordingly, when a left hand turn is contemplated, it is merely necessary to swing the shutter 16 into an open position, although when a right hand turn is contemplated the arrow sign 5 is shifted to the left at the same time that the shutter is opened, thereby covering the arrow head at the left hand end of the double headed arrow and causing the arrow to indicate a contemplated turn to the right.

The before-mentioned operating shafts 15 for the respective "Slow" and "Stop" shutter 13 have a square or angular cross section and are twisted at intermediate portions in the length thereof, as indicated at 15ª. The inner end of these shutter operating shafts are received loosely within polygonal openings 24 in the upper ends of corresponding shutter operating levers 25. These levers converge downwardly toward each other and each has a channel shaped cross section, as indicated more clearly by Figs. 4 and 6. The side flanges of the channel shaped levers straddle or receive between them suitable brackets 26 which are secured to the back of the casing, and the levers are pivotally connected at intermediate points in their lengths to the brackets by means of the pivot pins 27. The levers are normally held yieldably in inoperative position by means of coil springs 28 which are connected at their upper ends to lips 29 pressed outwardly from the levers, and at their lower ends to fixed pins 30 on the brackets 26. The lower and converging ends of the shutter operating levers 25 are connected to the respective cables 31 and 32 which extend through the back of the casing and are carried toward the front of the vehicle, having operative connections, respectively, with the clutch pedal C and the brake pedal B (see Figure 9). With this construction it will be obvious that when either one of the cables 31 or 32 is pulled upon, the corresponding shutter operating lever 25 will be oscillated upon its pivot and the polygonal opening 24 in the upper end thereof brought into engagement with the twisted portion $15^a$ of the shutter operating shaft 15, with the result that the shaft will be rotated about its axis, and the shutter 13 swung outwardly and upwardly into position to uncover the corresponding sign and expose it to view. As soon as the tension of the cable is released the shutter operating lever 25 will be returned to its original position by the action of the spring 28, and this movement of the lever will reversely rotate the shaft 15 and return the shutter 13 to its original closed position.

Figures 5, 6, 7, 8:
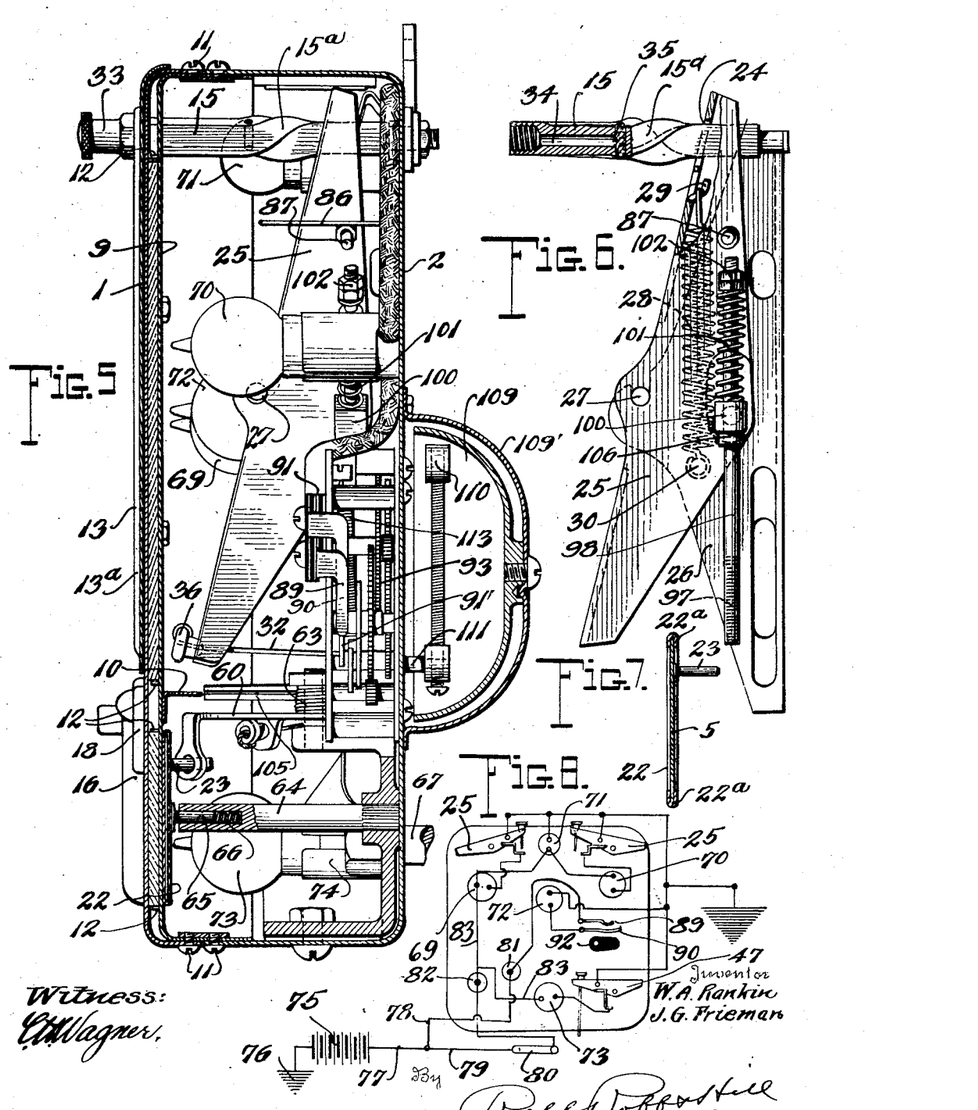
Figure 6 is a detail view of the operating lever for the "Stop" shutter, together with associated parts.
Figure 7 is a transverse sectional view through the direction indicating sign which is provided with the double headed arrow.
Figure 8 is a diagrammatic view illustrating the electric circuits for the various lamps.

In Figure 6 of the drawings I have illustrated a possible means for supplying lubricant to the twisted portions $15^a$ of the shutter operating shafts 15. The outer ends of the said shafts are threaded to receive grease cups 33 and an axial passage 34 extends inwardly from the grease cup and communicates with a transverse opening within which a wick member 35 is placed. This wick member is kept saturated with lubricant and the ends thereof are substantially flush with the side walls of the shaft 15 so that the necessary amount of lubricant will be supplied therefrom to the edges of the openings 24 in the shutter operating levers 25 as the latter are oscillated into and out of operative position.

Figure 9:
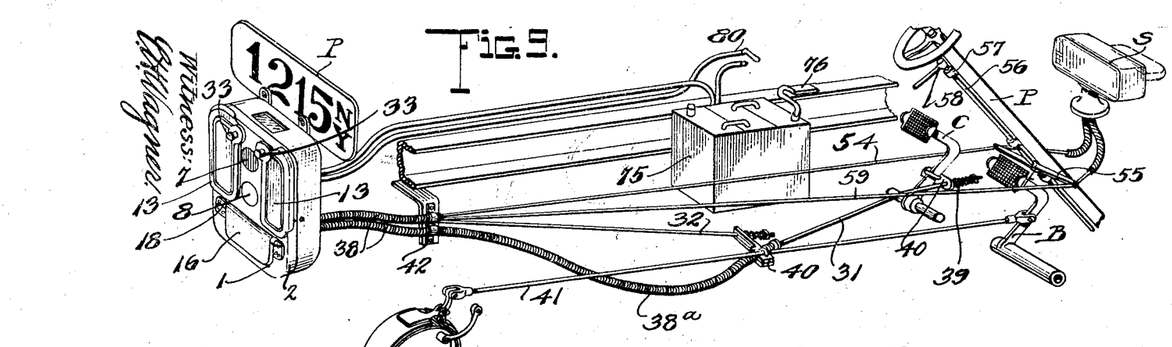
Figure 9 is a perspective view of a fragmentary portion of a vehicle frame showing one possible manner of mounting the signal device upon a vehicle.
Figure 10:
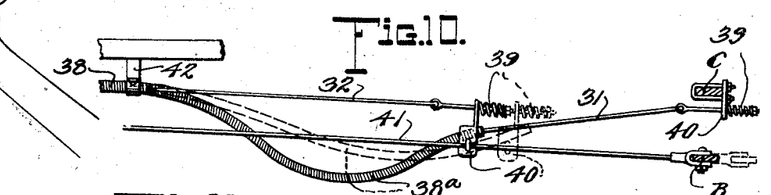
Figures 10 and 11 are detail views showing different constructions for automatically returning the "Slow" shutter to closed position when both the clutch pedal and brake pedal are pressed forward at the same time.

The rear ends of the cables 31 and 32 are shown as passing loosely through openings in the lower ends of the shutter operating levers 25 and attached to suitable buttons 36 which engage the levers. The cables pass through suitable guide openings in a bushing 37 which is fitted in the back of the casing, and the various cables pass through suitably mounted flexible guide tubes 38 which are attached at their rear ends to the bushing 37. As shown in Figure 9, the cable 32 is connected, preferably in a yielding manner, as indicated at 39, to a bracket 40 which is rigidly secured to the rod 41 connecting the brake pedal B with the service brake of the vehicle. The cable 31 extends through an elongated flexible guide tube $38^a$, which has the forward end thereof attached to the bracket 40, the forward extremity of the cable 31 having a yielding connection 39 with the clutch pedal C. The length of the flexible guide tube $38^a$, between the bracket 40 and the point of attachment 42 with the vehicle frame, is sufficiently great for the tubular guide member to normally have a certain amount of slack and sag. When the clutch pedal C is pressed forwardly the clutch is opened and tension produced in the cable 31 which causes the shutter 13 for the "Slow" sign to be swung upwardly into an open position. Correspondingly, when the brake pedal B is pressed forwardly the cable 32 is placed under tension, with the result that the shutter 13 for the "Stop" sign is swung upwardly into an open position. If both the clutch pedal C and the brake pedal B are pressed forwardly at the same time, it is preferred that the shutter 13 for the "Slow" sign assume or remain in a closed position, while the shutter for the "stop" sign is swung into an open position, and this result is accomplished by the peculiar cable connections which I have just described. Referring again to Figure 9, it will be obvious that when the brake pedal B is pressed forwardly, the bracket 40 which is connected to the brake rod is also carried forward, with the result that the sag or slack in the flexible guide tube $38^a$ is taken up and the effective length of the cable 31 increased, so that any movement of the clutch pedal C to open the clutch is not sufficient to take up the slack produced in the cable by the straightening out of the tubular guide $38^a$. In other words, the full length of the cable 31 is greater than is necessary to produce a direct connection between the clutch pedal and the shutter operating lever, although the surplus length of the cable is normally taken care of by the sag or curvature of the guide member $38^a$. However, when this guide member $38^a$ is straightened out and the sag or curvature removed therefrom, a slack is produced in the forward end of the cable, with the result that the movements of the clutch pedal C in the normal operation thereof are not sufficient to produce a tension in the cable and operate the shutter of the signal. It will thus be seen that when both the clutch pedal and the brake pedal are moved forwardly at the same time, the shutter 13 for the "Stop" sign will be swung into an open position while the shutter for the "Slow" sign will remain in a closed position. If the shutter for the "Slow" sign was previously in an open position, the slack produced in the cable 31 by the forward movement of the brake pedal will permit the spring 28 of the shutter operating lever to return the shutter for the "Slow" sign to a closed position.

Figure 11:
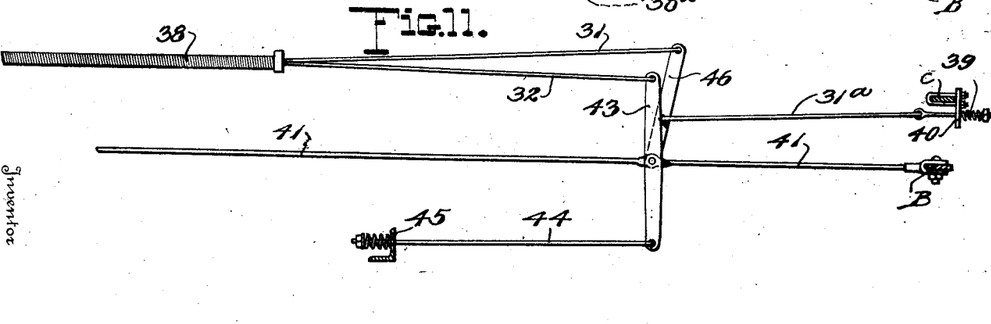

Another means for accomplishing the same result is illustrated by Figure 11, in which the brake rod 41 is attached to the middle portion of the lever 43. One end of this lever is suitably connected by means of a rod or tie member 44 to some portion of the vehicle frame, such as that shown at 45, while the other end of the lever has the cable 32 connected thereto. The usual movement of the brake pedal B thus results in oscillating the lever 43 and pulling upon the cable 32 to swing the shutter 13 for the "Stop" sign into an open position. The cable 31 is connected to one end of an auxiliary lever 46 which is pivoted to the middle portion of the lever 43. This auxiliary lever 46 is connected by a rod or cable 31ᵃ to the clutch pedal C. When the clutch pedal C is moved forwardly independently of the brake pedal B, the lever 46 is swung upon its pivot and the cable 31 pulled to swing the shutter for the "Slow" sign into an open position. It will be obvious, however, that any movement of the brake pedal results in moving the axis of the auxiliary lever 46 forward in such a manner as to produce slack in the cables 31 and 31ᵃ, so that the operative connection between the clutch pedal and the corresponding shutter operating lever is destroyed.

Figure 1:
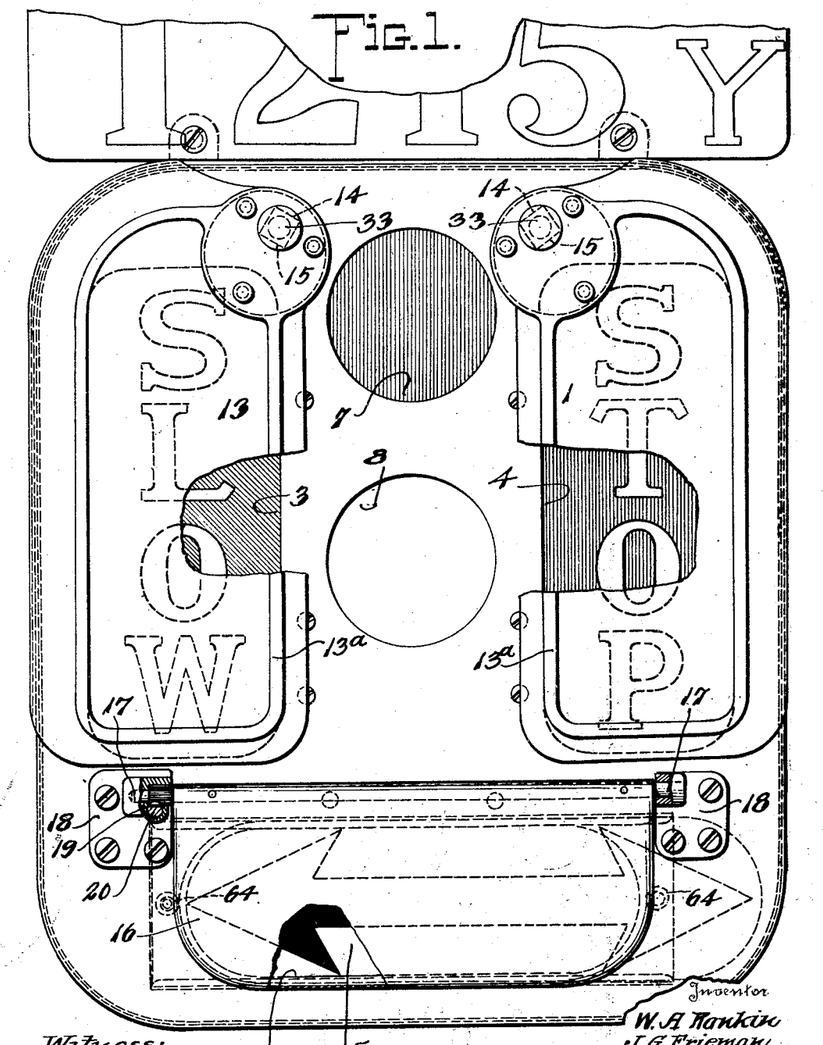
Figure 1 is a front elevation of a signal device which is constructed in accordance with the invention, portions being broken away and shown in section.
Figure 2:
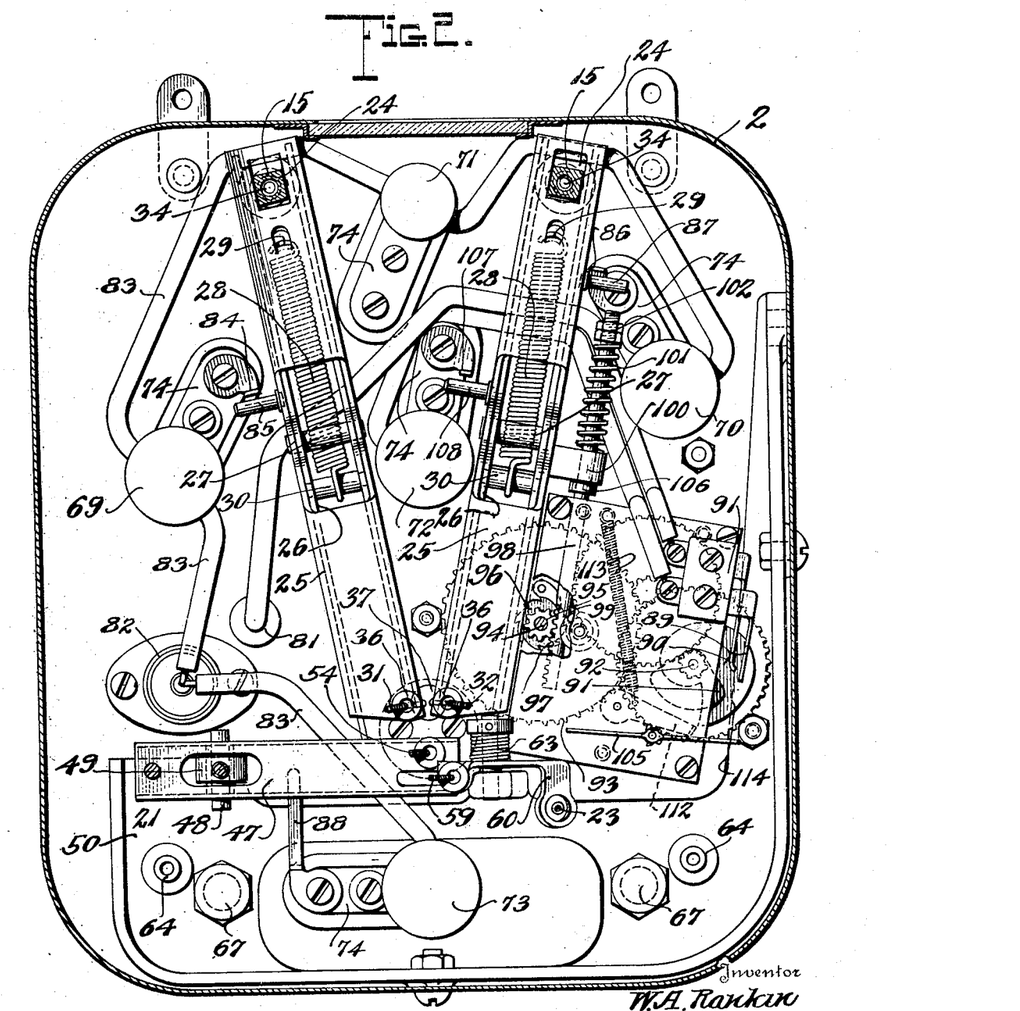
Figure 2 is a vertical sectional view through the signal device, looking toward the back thereof.
Figures 4, 5:
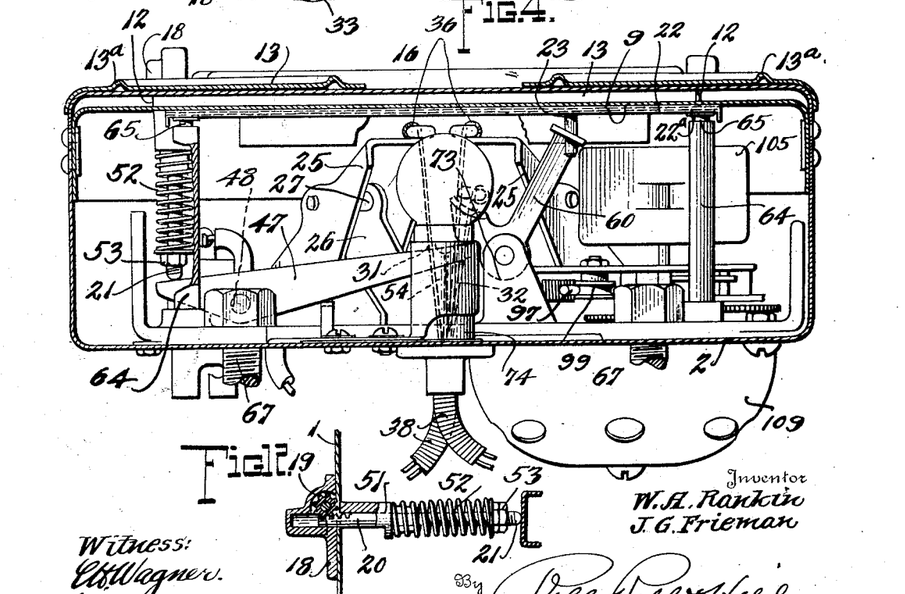
Figure 4 is a horizontal sectional view through the lower portion of the device, looking upwardly.
Figure 5 is a transverse vertical sectional view.

The shutter operating lever 47 for the shutter 16 of the direction indicating sign 5 is substantially horizontally disposed, as indicated by Figures 2 and 4, being pivotally mounted at 48 upon an ear 49 projecting from a suitable frame or casting 50 which is secured within the interior of the casing 2 for the purpose of facilitating the assembly of certain parts of the mechanism therein. The short arm of the shutter operating lever 47 engages the rear end of the before-mentioned plunger 21 which has the rack 20 at the forward end thereof (see Fig. 12). The plunger extends loosely through a guide bracket 51 which is secured to the front of the casing, being shown as forming a part of the hinge member 18. A coil spring 52, which surrounds the rear end of the plunger, is interposed between the guide bracket 51 and a suitable abutment such as the nut 53 on the plunger. This spring is placed under compression when the plunger is moved forwardly to open the shutter 16, and as soon as the shutter operating lever 47 is released the energy which was stored up in the spring moves the plunger back to its original position and closes the shutter.

The other end of the shutter operating lever 47 is connected to a cable 54 which extends through the casing of the signal and is carried to the front of the vehicle where it is attached to one end of a cross head 55 at the lower end of a shaft 56 which is mounted on the vehicle steering post P. This shaft 56 may be suitably journaled within bearings such as those indicated at 57, and a handle 58 at the upper end of the shaft is adapted to be swung by the driver of the vehicle either to the right or to the left when he contemplates making a turn in either direction. A second cable 59, which is connected to the opposite end of the cross head 55, extends rearwardly to the signal casing and has the end thereof connected to one arm of a bell crank lever 60 which is suitably pivoted upon a bracket 61 projecting from the frame 50. The two cables 54 and 59 extend through the before-mentioned bushing 47 in the back of the casing, and a flexible guide tube 38 is provided for the rear end portions of these cables. The arm of the bell crank lever 60, to which the cable 59 is attached, is adapted to engage the shutter operating lever 47, so that the said lever 47 is necessarily operated when the bell crank lever 60 is operated, although the lever 47 can be operated independently of the bell crank lever. The other arm of the bell crank lever terminates in a laterally offset eye 62 (see Figs. 4 and 5), which loosely receives the before-mentioned arm 23 of the arrow sign 5. The arrow sign is normally in such a position as to indicate a turn to the left, and when the handle 58 on the steering post is swung to the left, the cable 54 is placed under tension while a slack is produced in the cable 59. The pulling of the cable 54 swings the shutter operating lever 47 and opens the shutter 16, although the position of the arrow sign 5 remains unchanged and this sign indicates that a turn to the left is contemplated. If the driver of the machine swings the handle 58 on the steering post to the right, the cable 59 is placed under tension and the bell crank lever 60 oscillated about its pivot. This results in sliding the arrow sign 5 to shift the position thereof so that the arrow head at the left hand end thereof is covered up, and the arrow head at the right hand end thereof exposed, thereby causing the arrow to indicate a contemplated turn to the right. As previously explained, the short arm of the bell crank lever 60 overhangs the long arm of the shutter operating lever 47, so that the latter is necessarily operated to swing the shutter 16 into an open position. It will thus be obvious that regardless of whether the handle 58 on the steering post is swung either to the right or to the left, the arrow sign 5 will be exposed by the opening of the shutter and will be properly positioned to indicate the direction of the contemplated turn. The axis of the bell crank lever 60, as shown more clearly by Figure 5, is provided with a helical spring 63 which assists in returning the lever to normal position when the tension on the operating cable is released.

For the purpose of supporting the guide frame 22, upon which the arrow sign 5 is slidably mounted, in operative position, the frame or casting 50 which is secured in the back of the casing body 2 at the bottom thereof is provided with a pair of forwardly projecting posts 64. The free ends of these posts are recessed and slidably receive the stems of headed fastening and positioning members 65 which are secured to opposite end portions of the guide frame 22 (see Figs.

4 and 5). The heads of the members 65 are attached to the guide frame, while the stems thereof have a telescoping engagement with the posts 64. Springs 66 are arranged within the recessed outer ends of the posts 64 and engage the stems of the members 65, thereby yieldably pressing the stems outwardly and holding the guide frame 22 firmly in position against the glass for the bottom window 6 of the casing. This manner of mounting the parts tends to facilitate the assembly of the mechanism within the casing before the front or cover is applied thereto, and the springs 66 hold the guide frame 22 in a proper engagement with the glass without any looseness or rattling of the parts. The casing 2 may be secured to the vehicle, preferably at the rear or back portion thereof, in any desired manner, as by means of the bolts 67 which are shown at the back of the casing. As shown by the drawing, the bolts 67 are arranged toward the bottom of the casing and extend through the frame or casting 50 on the inside of the casing so as to obtain a firm bearing and enable the casing to be rigidly fastened in position. The top of the casing is provided at the back thereof with suitable means such as the bracket strips 68 for enabling the usual license plate, such as that indicated by the reference character P, on Figure 9, to be attached thereto. This license plate is adapted to be illuminated in the usual manner by one of the lamps within the casing which performs all of the functions of the usual tail light on a vehicle.

As indicated more clearly by Figures 2 and 5 of the drawings, a number of electric lights are mounted within the casing, one of the lights being arrranged back of each of the windows or openings of the casing, and suitable means being provided for illuminating or flashing the different lamps at proper times. The lamp 69 is arranged back of the "Slow" sign. The lamp 70 is arranged back of the "Stop" sign. The lamp 71 is arranged back of the ruby window 7 and takes the place of the usual tail light. The lamp 72 is arranged back of the clear glass 8 which fits over a window disposed immediately below the ruby light. Another lamp 73 is arranged at the bottom of the casing back of the window 6 through which the arrow sign 5 is displayed. These lamps are mounted in bases 74 which may be of any conventional construction, said bases being secured to the back of the casing; and the base 74 for the tail light 71 being grounded upon the casing, while the other lamp bases are insulated from the casing.

The electric circuits are illustrated diagrammatically by Figure 8 and will be clear from a reference to this figure in connection with Figs. 2 and 9. The electric current is taken from the usual battery 75 which forms a part of the standard equipment for the motor vehicle. One of the terminals of this battery is grounded, as indicated at 76. The wire 77 from the other battery terminal is provided with the two branches 78 and 79. The branch 79 provides the electric current for illuminating all of the lamps within the casing except the lamp 72 which is supplied with its current through the wire 78. The branch wire 79 is provided with a switch 80 which is located at some convenient position, as upon the dash board of the vehicle, so that the circuit through the branch wire 79 can be opened or closed as desired. This circuit includes the tail light 71, and the switch would be closed when driving the vehicle at night or in dark places, although in the daylight the switch would be opened, since there would then be no need for illuminating the lights controlled thereby. There is no switch for the branch wire 78 which supplies current for the lamp 72, and mechanism is provided for always flashing this lamp, preferably intermittently, when the "Stop" sign is displayed. This branch wire 78 goes through a separate opening 81 in the back of the casing, while the branch wire 79 may be connected to a conventional plug which detachably engages a corresponding socket member or bushing 82 with which the casing is provided. On the inside of the casing wires 83 connect the branch wire 79 with all of the lamp bases 74 and with one of the terminals of each of the lamps. The other terminal of the tail light 71 is grounded so that the tail light burns continuously as long as the switch 80 is closed, although the lamps 69, 70 and 73 are normally dark and are only caused to burn when the shutters for the respective windows are moved into open positions.

The lamp base 74 for the lamp 69 which is back of the "Slow" sign is provided with an outwardly projecting spring contact arm 84 which is adapted to be engaged by a complemental contact pin 85 on the adjacent shutter operating lever 25 when the said lever is oscillated to open the corresponding shutter 13. This results in grounding the circuit through the lamp 69 so that the said lamp is caused to burn when the "Slow" sign is uncovered and exposed to view, although at other times this lamp is dark. In a similar manner the base 74 for the lamp 70 back of the "Stop" sign is provided with an outwardly projecting spring contact arm 86 which is arranged to be engaged by a complemental contact pin 87 on the adjacent shutter operating lever 25 when the latter is oscillated to operate the corresponding shutter 13. This results in grounding the circuit through the lamp 70 and causing the lamp to burn when the "Stop" sign is uncovered and displayed to view, although at all other times this lamp is dark. It will also be observed that the base 74 for the lower lamp 73 is provided with a spring contact arm 88 which projects upwardly into the path of the shutter operating lever 47 for the arrow sign 5. The circuit through this lamp 73 is thus grounded and the lamp caused to burn when the shutter 16 is swung upwardly to uncover the arrow sign 5, although at other times this lamp is dark. The different signs are, of course, of a transparent nature so that they are effectively illuminated and rendered clearly visible at night by the burning of the lamps when the signs are uncovered and exposed to view.

When the "Stop" sign 4 is uncovered, the lamp 72 is intermittently flashed and a gong or bell sounded so as to attract attention thereto. Interposed in the length of the wire 78, which leads from the battery to one of the terminals of the lamp 72, are the two normally spaced contact arms 89 and 90, said members being properly insulated and mounted upon the block 91. The contact arm 90 is arranged in the path of a cam member 91' so that when this cam member is rotated it will intermittently flex the arm 90 into engagement with the arm 89 and release the same. For the purpose of rotating the cam shaft 92 a train of gearing 93 is provided for connecting this shaft to a main shaft 94. A pinion 95 is loosely mounted upon the main shaft and operatively connected thereto by a conventional pawl and ratchet device 96 so that the shaft will rotate with the pinion when the pinion is turned in one direction, although the pinion will move independently of the shaft when turned in the other direction. The pinion is engaged by a rack 97 at the lower end of a plunger 98 which has a yieldable connection with the adjacent shutter operating lever 25. A suitable guide wheel 99 may be provided for engaging the back of the rack 97 to hold the teeth of the rack in a proper normal engagement with the pinion 95. The upper end of the plunger 98 passes slidably through a guide sleeve 100 which has a swivel connection with the lever 25, and a coil spring 101 which surrounds the plunger 98 is interposed between the sleeve 100 and an abutment provided by nuts 102 at the upper extremity of the plunger (see Fig. 6). The guide sleeve 100 is connected to the shutter operating lever 25 by means of a pin 103 which is arranged parallel to the pivot pin of the lever and connects the two side flanges of the lever. This necessitates the provision of a clearance slot 104 in the bracket 26 upon which the lever 25 is mounted, and this clearance slot is shown by dotted lines on Fig. 6. With this construction it will be obvious that when the shutter operating lever 25 is operated, the sleeve 100 will be moved upwardly on the plunger 98, and energy stored up in the spring 101.

This stored up energy in the spring tends to move the plunger upwardly and causes the rack 97 to turn the pinion 25 and rotate the main shaft 94. Motion is transmitted from this main shaft 94 through the train of gearing 93 to the cam shaft 92 of the flasher. A conventional fan member 105 on this shaft (see Fig. 4) operates as a governor to control the speed of the shaft and, as the shaft is rotated, the cam member 92 intermittently flexes the spring contact strip 90 into engagement with the contact strip 89 and releases the same. The cam member is, of course, properly insulated or formed of insulating material so that the circuit will not be grounded at this point. When the shutter operating lever 25 is restored to its original position the guide sleeve 100 engages a collar 106 on the plunger so that the plunger is moved back to its original position. The lamp flasher, as this mechanism may be called, is not operated at this time, however, owing to the fact that the pawl and ratchet mechanism 96 now permits the pinion 95 to turn independently of the main shaft.

The base 74 of this flashing lamp 72 is provided with an outwardly projecting spring contact arm 107, which is arranged in the path of a contact pin 108 projecting laterally from the adjacent shutter operating lever 25, so that the circuit through the lamp will be grounded when the shutter operating lever is moved to open the shutter and uncover the "Stop" sign. This arrangement prevents the lamp 72 from burning continuously in the event the flashing mechanism should stop with the contact arms 89 and 90 held in engagement with each other by the cam 91. The lamp 72 is normally dark, although when the lever 25 is operated to uncover the "Stop" sign, the lamp 72 is grounded and the flashing mechanism set into operation so that this lamp is intermittently flashed as long as any stored up energy remains in the spring 101. At the same time, as previously explained, the lamp 70 back of the "Stop" sign is illuminated. The intermittent flashing of the lamp 72 serves to attract attention to the signal and this lamp is flashed at all times when the "Stop" sign is uncovered. When the tail light 71 is burning the license plate P is illuminated through a window 107 in the top of the casing, and the ruby glass 7 in the front of the casing provides the usual red light which is required by law.

Figure 3:
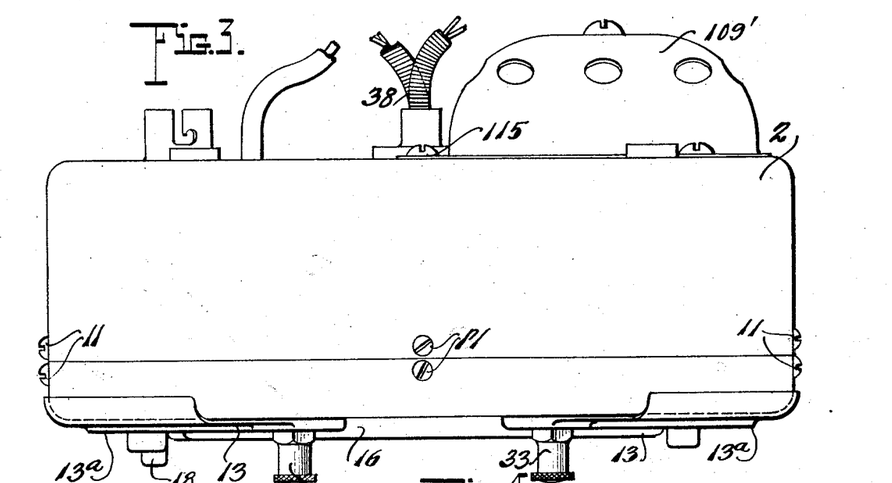
Figure 3 is a top plan view of the device.

The audible signal is in the form of a bell 109 which is carried by and arranged within a perforate housing 109' applied to the back of the casing, as indicated by Figures 3 and 5. The bell clapper 110 is fitted upon a projecting end of the shaft 111 extending through the flashing mechanism. The opposite end of the shaft 111 is provided with an arm 112 which is held by the action of a spring 113 in engagement with a snail cam 114 on the shaft 92. With this construction it will be obvious that when the flasher mechanism is set into operation to intermittently flash the lamp 72, the clapper 110 is vibrated to sound the bell. The bell housing 109 is secured to the back of the main casing by suitable fastening means 115 and may be shifted slightly for the purpose of positioning the bell in the most advantageous manner relative to the clapper 110. The simultaneous operation of the audible signal and visible signal will be most effective in attracting attention to the "Stop" sign when the latter is displayed.

As indicated by Fig. 9 an auxiliary signal device S may be mounted in a convenient position at the forward end of the vehicle. The construction of this auxiliary signal device is clearly set forth in my copending application, executed and filed of even date herewith. The device is provided with a double headed arrow sign such as the sign 5 which has been previously described, and the position of this arrow is shifted through the medium of the cables 116, so that the sign may indicate a turn to either the right or the left. The cables 116 are connected to opposite ends of the cross head 55 so that the two direction indicating signals at the front and rear of the vehicle, respectively, are operated simultaneously to indicate the direction of the turn which is contemplated by the driver of the vehicle.

The direction indicating signal can be operated at any time by swinging the hand lever 58 which is under the steering wheel to either the right or to the left, as has been previously described. The display of the "Slow" and "Stop" signs is controlled automatically by the movements of the clutch pedal C and the brake pedal B, and this phase of the operation of the signal has also been fully explained. It will also be obvious that the direction indicating signal may be given simultaneously with a warning by uncovering the "Slow" sign or the "Stop" sign. Normally the shutters are all closed, and the various shutters are selectively opened to give the desired signals to pedestrians and other vehicle drivers, the operation of the direction indicating signal being manually controlled, while the operation of the "Stop" and "Slow" signals is automatically controlled, being determined by the movements of the clutch and brake pedals which are incident to the driving of the vehicle.

While one preferred embodiment of the invention has been shown and described in detail, it will be understood that many modifications and changes can be made without any departure from the spirit and scope of the invention.

Having thus described my invention, what I claim as new and desire to secure by Letters Patent is:

1. A signal device of the character described, including a sign, a shutter for the sign, and means for actuating the shutter including a member disposed at the axis of the shutter and having a spiral portion in combination with another element having a sliding engagement with the said spiral portion whereby rotary motion is produced to swing the shutter.

2. A signal device of the character described, including a sign, a shutter for the sign, a shutter operating shaft having a spiral portion, and an operating element slightly engaging the spiral portion for co-operation therewith to swing the shutter.

3. A signal device of the character described, including a sign, a shutter for the sign, a shaft carrying the shutted and provided with a spiral portion, and an operating lever slidably engaging the shaft and cooperating with the spiral portion thereof to rotate the shaft and swing the shutter.

4. A signal device of the character described, including a sign, a shutter normally covering the sign, a shaft carrying the shutter and having a twisted spiral portion, an operating member slidably engaging the shaft and cooperating with the spiral portion thereof to rotate the shaft and move the shutter to uncover the sign, and resilient means for returning the shutter to normal position as soon as it is released.

5. A signal device of the character described, including a sign, a shutter normally covering the sign, a shaft carrying the shutter and having a twisted spiral portion, a shutter operating lever having one end thereof in sliding engagement with the shaft and adapted to cooperate with the spiral portion thereof to rotate the shaft and swing the shutter away from the sign, and a spring connected to the lever for returning the same to its original position as soon as it is released.

6. A signal device of the character described, including a sign, a shutter normally covering the sign, a shaft carrying the shutter and formed with a spiral portion, means operable from an end of the shaft for supplying lubricant to the spiral portion thereof, and an operating member slidably engaging the shaft and cooperating with the spiral portion thereof to rotate the same and swing the shutter.

7. A signal device of the character described, including a signal, signal operating means, a spring, means connecting the spring with the operating means for storing up energy in the spring upon actuation of the signal operating means, and means actuated by the energized spring for attracting attention to the signal while exposed.

8. A signal device of the character described, including a signal, a spring, means connecting the spring with the operating means for storing up energy in the spring when the signal is operated, and both audible and visible means actuated by the energized spring for attracting attention to the signal when the latter is exposed.

9. A signal device of the character described, including a signal, means for storing up a certain amount of energy when the signal is operated, attention attracting means, means for actuating the attention attracting means including a train of gearing, and means for operating the train of gearing with the before mentioned stored up energy.

10. A signal device of the character described, including a signal, means for storing up a certain amount of energy when the signal is operated, attention attracting means, means including a train of gearing for actuating the attention attracting means, a speed governor associated with the train of gearing, and means for operating the train of gearing with the before mentioned stored up energy.

11. A signal device of the character described, including a signal, means for operating the signal, a spring actuated plunger, means for automatically energizing the spring of the plunger when the signal is operated, a drive shaft, a rack and pinion connection between the plunger and drive shaft arranged to actuate the shaft when the plunger is moved in one direction by the action of the spring and to permit the return of the plunger to normal position without rotating the shaft, and attention attracting means operated by the said shaft.

12. A signal device of the character described, including a signal, a signal operating lever, a plunger having a yieldable connection with the said lever, a shaft, an operative connection between the plunger and the shaft for rotating the shaft when the lever is operated, and attention attracting means operated by the shaft.

13. A signal device of the character described, including a signal, a signal operating lever, a guide sleeve upon the lever, a plunger slidable within the sleeve and having an abutment thereon, a spring interposed between the sleeve and the abutment and arranged to be compressed when the lever is operated, and attention attracting means actuated by the movements of the plunger.

14. A signal device of the character described, including a casing provided with a "Slow" sign, a "Stop" sign, and a direction indicating sign, shutters normally covering the signs, operative connections between the shutters for the "Slow" sign and "Stop" sign and movable control elements of the vehicle whereby the shutters are automatically controlled by the movements of the said elements incident to the driving of the vehicle, and selective means for setting the direction indicating sign and operating the shutter therefor.

15. A signal device of the character described, including a casing provided with a selectively controlled direction indicating sign, and an automatically controlled associated warning sign, shutters normally covering the signs, and means for operating the shutters either independently of each other or simultaneously.

In testimony whereof we affix our signatures.

JACOB G. FRIEMAN.
WILLIAM A. RANKIN.